United States Patent
Plana

[15] 3,677,314
[45] July 18, 1972

[54] AUTOMATIC VEGETABLE PEELER

[72] Inventor: Salvio Plana, 325 Lindsey Street-Apt. 3, Drummondville, Quebec, Canada

[22] Filed: Sept. 8, 1970

[21] Appl. No.: 70,440

[52] U.S. Cl. ........................................... 146/49 B
[51] Int. Cl. .............................................. A23n 7/00
[58] Field of Search ........................ 146/49 B, 50 A

[56] References Cited

UNITED STATES PATENTS

| | | | |
|---|---|---|---|
| 999,478 | 8/1911 | Archer | 146/49 B |
| 1,886,061 | 11/1932 | Speidel | 146/50 A |

*Primary Examiner*—Willie G. Abercrombie
*Attorney*—Pierre Lesperance

[57] ABSTRACT

A vegetable peeler comrising a housing and a peeling bowl having an abrasive inner surface supported for rotation in the housing. A flat turntable is supported for rotation in close proximity to the bottom of the peeling bowl. The turntable is also provided with an abrasive upper surface. The peeling bowl and the turntable are both driven in opposite direction to one another.

7 Claims, 2 Drawing Figures

PATENTED JUL 18 1972

3,677,314

INVENTOR
Salvio PLANA

Alan Swabey

ATTORNEY

AUTOMATIC VEGETABLE PEELER

This invention relates to an automatic vegetable peeler and more specifically to a peeler having a driven side wall and a driven base.

The vegetable peelers heretofore known to the inventor, utilize in the majority, a fixed abrasive side wall and a driven abrasive turntable base. The disadvantage of this combination is that when a substantial quantity of vegetables are placed in the peeler, the turntable does not create enough disturbance or agitation of the vegetables because these are crowded and tend to rotate as a solid mass with the turntable. Another disadvantage, when this condition occurs, is that the vegetables sitting on the outside of the disc, will grind themselves excessively on the side wall.

Further, most of the vegetable peelers utilize a certain quantity of water in the abrasive container whilst the peeler is in operation. Although this washes the vegetables during the peeling operation and softens the skin of the vegetables, it does not sufficiently clean the abrasive surfaces and internal parts of the peeler and this is not sanitary in that small quantities of peels not washed away causes bad odors in the peeler.

A further disadvantage of the vegetable peelers known to the inventor is that they do not remove the sprouts and peels located in the cavities on the surface of certain vegetables. This is most evident with potatoes where its surface is not uniform and includes many cavities.

It is an object of the present invention to provide an automatic vegetable peeler which substantially overcomes any of the abovementioned disadvantages.

According to one broad aspect the present invention relates to a vegetable peeler comprising a housing and a peeling bowl having an abrasive inner surface supported for rotation in the housing. A flat turntable is supported for rotation in close proximity to the bottom of the peeling bowl. The turntable is also provided with an abrasive upper surface. The peeling bowl and the turntable are both driven in opposite direction to one another.

The invention is illustrated, by way of example, in the accompanying drawings in which.

Figures 1, 2:
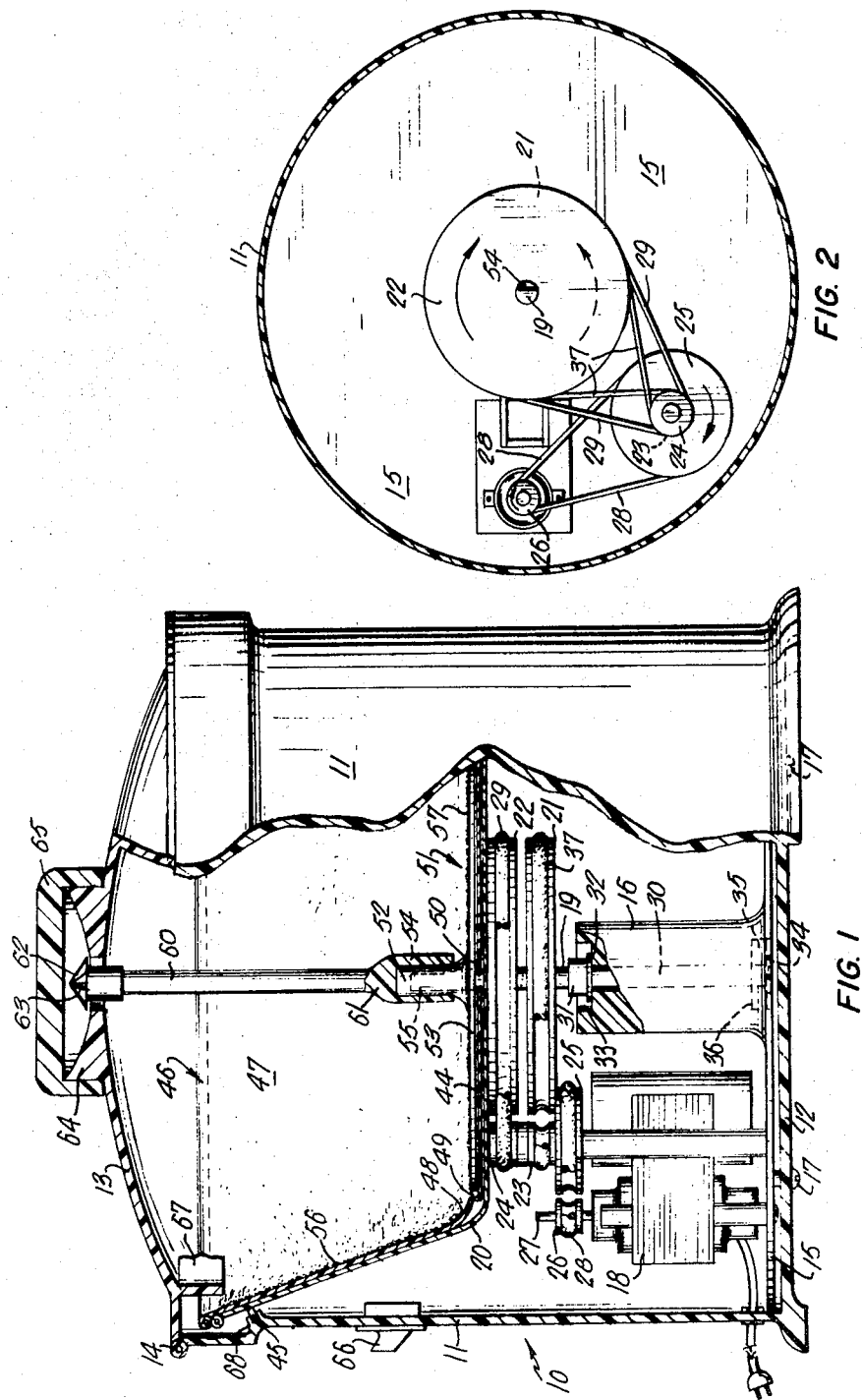
FIG. 1 is a fragmented side view of the vegetable peeler.
FIG. 2 is a top view of a portion of the vegetable peeler illustrating the arrangement of the drive mechanism.

Referring now to the drawings, there is shown generally at 10, the housing of the vegetable peeler consisting of a cylindrical side wall 11, an integral bottom wall 12 and a cover 13. The cover 13 is hinged to the side wall 11 by means of a hinge 14. A supporting base plate 15, having a central upstanding boss 16, is removably secured, by means of screws 17, over the bottom wall 12. The base plate 15 supports all the working parts of the vegetable peeler.

An electric drive motor 18 is secured directly on the base plate 15 and provides the rotational drive to a central circular upstanding driven shaft 19 and a supporting bowl 20 via a sheave 21 and 22, respectively. Sheave 21 is connected to the shaft 19 and sheave 22 to the bottom of the supporting bowl 20. At the center of sheave 22 there is secured a bearing (not shown) which secures the sheave 22 for rotational displacement about the shaft 19. Shaft 19 is supported in a vertical position by the upstanding boss 16 and is supported therein in a central bore 30. The shaft 19 is provided with a shoulder portion 31 which rests on a washer 32 resting about the bore 30 on top of the boss 16 in a cavity 33. The base of the idle shaft 19 is secured in rotational position by a screw 34 secured in its lower end over a circular spacer 35 located in a cavity 36. The upper end of the shaft 19 extends through the supporting bowl 20.

Sheaves 21 and 22 are driven by sheaves 23 and 24, respectively, which are secured together one on top of the other and to a driven sheave 25. Driven sheave 25 is connected to the drive sheave 26 secured to the drive shaft 27 of the electric motor 18. As can be seen from FIG. 2, the drive is transmitted from sheave 26 to sheave 25 via a circular rubber band 28 or other suitable drive belts. Sheave 23 and 21 are connected together by means of rubber band 29. Thus, the drive shaft 27 and sheaves 26, 25, 23, 21 and shaft 19 are all driven in the same direction. Sheaves 22 and 24 are also connected by a rubber band 37, however, the band 37 is connected in a figure-8 configuration to transmit a reverse drive to sheave 22. Since sheave 24 is secured to sheave 23, therefore sheave 22 rotates in the opposite direction the sheave 21. Because the supporting bowl 20 is connected to sheave 22 it will rotate in the same direction as sheave 22.

The supporting bowl 20 has a conical side wall sloping inwardly from top to base. The bowl 20 is prevented from wobbling, when in rotation, by suitable means such as a few small idler wheels 45 held in position by the inner face of the side wall 11 of the housing 10. Within the supporting bowl 20 is placed a peeling bowl 46 having a side wall 47 of substantially the same conical shape as bowl 20 but of slightly smaller circumference so as to be in frictional engagement with the supporting bowl 20. The side wall 47 has a curvate bottom section 48 which connects to a flat circular recess section 49. The center of the recess section 49 has a circular bore 50 therein to permit the shaft 19 to extend therethrough.

A turntable 51, comprising a shaft engaging boss 52 and a flat circular disc 53, is removably secured over the upper end of the shaft 19 which is notched at 54 to engage within a bore 55 in the boss 52. The flat circular disc 53 is of slightly smaller diameter than the bottom cavity section 49 and lies therein over the bottom face 44 of the cavity with the disc upper face lying substantially in the same plane as the upper edge of the cavity. Thus, the turntable 51 rotates with the shaft 19 in a direction opposite to that of the supporting bowl 20 and the peeling bowl 46.

In order to effect the peeling of vegetables placed within the peeling bowl 46, the inner face of the side wall 47 of the peeling bowl 46 and the upper face of the circular disc 53 are provided with an abrasive covering 56 and 57, respectively. The abrasive covering consists of abrasive particles fixedly secured to a water impervious backing material which is glued to the inner face of the side wall 47 and the upper face of circular disc 53. The abrasive covering may be replaced by a new covering when necessary.

The shaft engaging boss 52 is of square cross-section and is fitted with a removable vertical extension post 60 having a bottom end fitting 61 provided with a square bore therein to secure in close fit over the shaft engaging boss 52. The upper end of the extension post 60 defines a conical head 62 having a plurality of cutting edges 63 extending radially from the apex of the head 62. The conical head 62 extends above the cover 13 to be positioned at the center of a circular knob 64 having a concave upper surface 69 and formed integral with the cover 13. A cap 65 is provide in close fit over the knob 64.

In use, the vegetables are placed in the peeling bowl 46, the cover 13 is closed and the switch 66 is actuated. The motor 18 is energized and the drive is transmitted to the peeling bowl 46 and the turntable 51 as described hereinabove. The turntable 51 and the peeling bowl 46 are rotating approximately in the range of 200 to 300 r.p.m. and in opposite directions. If the rotational velocity of the peeling bowl 46 was too excessive, the vegetables would cling to the bowl side wall 47 due to the centrifugal force acting on the vegetables and simply rotate in an orbit. Because the peeling bowl 46 and the turntable 51 are rotating in opposite directions, the vegetables are rapidly agitated and strike the abrasive surfaces 54 and 55. The peels from the vegetables adhere to the abrasive surfaces and these are cleaned by simply removing the peeling bowl 46 and turntable 51 through the top of the peeler housing 10 and washing them.

Because of the close proximity of the turntable 51 to the peeling bowl side wall 47 and to the upper face of the bottom cavity section 49, the peels do not find their way outside the supporting bowl 20 which is also removable for washing. A circumferential lip 67 may also be provided in the inner face of the cover 13 to prevent peels from being projected over the upper edge of the peeling bowl. Further, a circumferential ledge 68 may be provided in the inner face of the side wall 11 to collect any peels that may be projected over the upper edge of the peeling bowl 46.

To remove sprouts and peels located in the cavities of vegetables such as potatoes, the cover 13 is closed, the cap 65 is removed from the knob 64 and the peeler is switched on. This causes the post 60 and conical head 62 to rotate. The vegetable is placed in the concave surface 69 with the cavity to be cleaned directly over the conical cutting head 62 which quickly cleans the cavity.

Although the embodiment herein disclosed is relative to a small household automatic vegetable peeler for peeling small vegetables such as potatoes, onions, beets, etc., it is foreseen that a substantially larger peeler embodying basically the same principle, can be constructed for commercial usage.

The embodiments of the invention in which an exclusive property or privelege is claimed are defined as follows:

1. A vegetable peeler comprising a housing, a peeling bowl having an abrasive inner surface and supported for rotation within said housing, a flat turntable supported for rotation in close proximity to the bottom of said peeling bowl and having an abrasive upper surface, and drive means adapted to drive said turntable and peeling bowl in opposite direction to each other, said turntable being provided with an auxiliary extension peeling means to peel the surface of cavities on the face of vegetables.

2. A vegetable peeler as claimed in claim 1 wherein said peeling bowl and turntable are removably secured in said housing, said peeling bowl being supported in frictional contact within a supporting bowl mounted for rotation within said housing.

3. A vegetable peeler as claimed in claim 1 wherein the bottom of said peeling bowl comprises a circular recess section within which said turntable is supported in close proximity thereto, the abrasive surface of said turntable being substantially in the same plane as the bottom edge of said peeling bowl.

4. A vegetable peeler as claimed in claim 1 wherein said auxiliary peeling means consists of a vertical extension post removably secured over an engaging boss located at the center of said turntable, said extension post having a conical head provided with cutting edges and extending above said peeling bowl.

5. A vegetable peeler as claimed in claim 4 wherein said housing is provided with a cover, said conical head extending through the center of said cover in a concave surface knob to provide exposure of the conical head only and to facilitate the cleaning of cavities in vegetables.

6. A vegetable peeler as claimed in claim 4 wherein said engaging boss also connects to the end of a driven shaft extending in a bore provided in said boss.

7. A vegetable peeler as claimed in claim 5 wherein a circumferential lip is provided in the inner face of said cover to prevent peels from being ejected over said peeling bowl.

* * * * *